(12) United States Patent
Zahavi et al.

(10) Patent No.: US 7,260,692 B1
(45) Date of Patent: Aug. 21, 2007

(54) METHODS AND APPARATUS FOR ACCESSING TRACE DATA

(75) Inventors: William Zahavi, Westborough, MA (US); Andrew M. Shooman, Sharon, MA (US); Yeshayahu Hass, Hod-Hasharon (IL)

(73) Assignee: EMC Corporation, Hopkinton, MA (US)

( * ) Notice: Subject to any disclaimer, the term of this patent is extended or adjusted under 35 U.S.C. 154(b) by 403 days.

(21) Appl. No.: 10/978,505

(22) Filed: Nov. 1, 2004

Related U.S. Application Data (63) Continuation of application No. 09/794,696, filed on Feb. 26, 2001, now Pat. No. 6,813,731.

(51) Int. Cl.
*G06F 11/34* (2006.01)
*G06F 12/00* (2006.01)

(52) U.S. Cl. .................... 711/154; 710/18; 714/45; 717/128

(58) Field of Classification Search ............ 711/154, 711/162; 714/45; 717/124, 128; 710/18
See application file for complete search history.

(56) References Cited

U.S. PATENT DOCUMENTS

| | | | | |
|---|---|---|---|---|
| 5,560,036 | A * | 9/1996 | Yoshida | 712/227 |
| 5,918,252 | A * | 6/1999 | Chen et al. | 711/217 |
| 6,366,325 | B1 * | 4/2002 | Wang | 348/465 |
| 6,397,318 | B1 * | 5/2002 | Peh | 711/220 |
| 6,732,307 | B1 * | 5/2004 | Edwards | 714/724 |
| 2002/0075399 | A1 * | 6/2002 | Nemiroff et al. | 348/390.1 |
| 2002/0138788 | A1 * | 9/2002 | Yenne et al. | 714/38 |

* cited by examiner

*Primary Examiner*—Jack Lane
(74) *Attorney, Agent, or Firm*—Chapin IP Law, LLC; Barry W. Chapin, Esq.

(57) ABSTRACT

A system provides mechanisms and techniques to retrieve trace data from a trace buffer residing in a data storage system. The software program operating on a processor within the data storage system operates in trace mode to produce trace data in the trace buffer upon occurrence of trace events. An event trace routine operates in response to a system call to access the trace buffer and return either a current value of a trace buffer pointer or the current trace buffer pointer as well as trace data read from the trace buffer beginning at a location and in an amount as specified in the system call to the event trace routine. The trace capture process can operate either within the data storage system or preferably on a remote host computer system to access trace data in the trace buffer in the data storage system by using the event trace routine. The trace capture process can periodically query the event trace routine with a frequency determined by an adaptive timing algorithm in order to detect the addition of trace data to the trace buffer. Upon detecting such a condition, the trace capture process can use the event trace routine to retrieve the trace data from the trace buffer. The trace capture process can also detect if trace data is written beyond the end of the trace buffer and can perform the proper sequence of trace data access operations using the event trace routine in order to provide continuous remote access to all trace data produced in the trace buffer.

20 Claims, 6 Drawing Sheets

TRACE CAPTURE PROCESS OPERATION

FIG. 1

TRACE BUFFER OPERATION

FIG. 2A

TRACE CAPTURE PROCESS OPERATION

TRACE CAPTURE PROCESS OPERATION

METHODS AND APPARATUS FOR ACCESSING TRACE DATA

CROSS REFERENCE TO RELATED APPLICATIONS

This application is a Continuation of U.S. patent application Ser. No. 09/794,696 filed on Feb. 26, 2001 now U.S. Pat. No. 6,813,731, entitled, "METHODS AND APPARATUS FOR ACCESSING TRACE DATA", the contents and teachings of which are hereby incorporated by reference in their entirety.

FIELD OF THE INVENTION

The present invention generally relates to systems for accessing trace data produced in a data storage system, and more particularly, to systems and techniques which provide a host computer system with remote access to such trace data in a continuous manner as the trace data is produced in the data storage system.

BACKGROUND OF THE INVENTION

Most types of computer systems have a requirement to maintain data for prolonged periods of time. To meet this requirement, a typical computer system includes a coupling to a data storage system which the computer system can access to store and retrieve the data. The computer system may be coupled to the data storage system via a high speed data transfer interface (e.g., a small computer system interface (SCSI), a Fibre-Channel interface (e.g., ESCON), or the like), or the coupling may be formed over a computer network such as a Storage Area Network (SAN) that may link a plurality of computer systems to one or more high-capacity data storage systems. Through an interoperation of software (e.g., applications, operating systems, protocols and the like) and hardware (e.g., circuitry) in both the computer system and the data storage system, the computer system is able to access data within storage media (e.g., disk drives) that the data storage system controls.

Within a typical data storage system, one or more processors (e.g., Central Processing Units or CPUs) operate according to prescribed software program(s) to manage and control access to the data within the storage media in the data storage system on behalf of the computer systems that request access to such data. Such data storage system software programs are generally considered the operating system or control program for the data storage system. For example, within a high-capacity data storage system such as one of the Symmetrix line of data storage systems manufactured by EMC Corporation of Hopkinton, Mass., U.S.A., a front end interface provides a coupling for the data storage system to one or more computer system(s) (via direct interfaces or via a SAN) while a back end interface provides a coupling to the storage media devices (e.g., disk drives) within the data storage system that stores data. The front and back end interfaces are coupled by a data bus (one or more) which allows the interfaces to interoperate with each other. A cache memory system is accessible on the data bus for use by the front and back end interfaces to temporarily store data during processing. A processor operating within the front end interface (e.g., on a circuit board that operates as the front end interface) operates a software program (e.g., firmware or microcode) that performs high speed processing of data (and requests for such data) between the front end interface and the remotely connected computer systems. Likewise, the back end interface includes a processor that operates a software program to handle tasks associated with accessing (e.g., reading and writing) data to and from the storage devices within the data storage system based on the requests received by the front end interface.

Due to the complex operation of a typical data storage system, the software programs which perform (e.g., execute or otherwise operate) on processor(s) such as the front and back end interfaces within a data storage system can become quite large and complex. By way of example, the microcode software program which provides the access request processing operations for a front end interface within a Symmetrix data storage system may be many thousands of lines of code in length. During the design, development and testing of such complex data storage system software control programs, software developers frequently include the ability for the software program to operate in a "trace mode" which allows the program to trace the occurrence of certain trace events during the program's operation. Essentially, trace mode operation causes the software program to capture trace data as defined by a software developer in relation to an occurrence of the certain defined or selected trace events.

Before operating a software program in trace mode in a conventional data storage system, a software developer is able to define one or more trace events and associated trace data which is to be captured upon occurrence of each trace event. The software developer can then operate the software program in trace mode. While operating in trace mode, the software program in the data storage system is able to detect occurrences of each trace event during operation of the software program. Upon detection of a trace event, the software program performs or calls a designated trace routine (which is itself generally considered part of the software control program) which is responsible for capturing trace data (e.g., variable or data structure values, data access request formats, command parameters, and so forth) related to the trace event. The trace routine places the trace data, which may include the current values of data structures, parameters, input/output request values, and so forth that are relevant to the trace event as designated by the software developer, within a trace buffer in the cache memory system within the data storage system. The trace buffer is typically a reserved area of the cache memory system which is limited in size, for example, to sixteen or thirty-two megabytes (MB).

After the software developer operates the software program in trace mode for a certain period of time in order to exercise the features of the program which would typically cause the trace event(s) to occur, the software developer can halt the operation of the software program. At this point, the trace buffer in the cache memory system contains the trace data which the trace routines captured during operation of the software program at the occurrence of each trace event. The software developer can then view the trace data within the trace buffer in the cache memory system by interaction, for instance, with a service processor (e.g., a keyboard and monitor) which is integrated as part of the data storage system. By reviewing the trace data, the software developer can determine if the software program for which the trace data was generated had properly performed in the data storage system during its operation.

Some data storage system configurations include a service processor that allows the software developer to download the trace data from the trace buffer onto a removable storage medium such as a floppy disk so that the trace data can be transported to another computer system for further analysis. By viewing the trace data according to these techniques, the software developer can debug the software program to determine whether or not it is operating properly.

SUMMARY OF THE INVENTION

Conventional systems and techniques for obtaining access to trace data produced as a result of operation of a data storage system suffer from a number of deficiencies.

One such deficiency relates to the limited size and/or capacity of a trace buffer within the cache of a data storage system. As noted above, in a typical conventional implementation of a trace buffer in a data storage system, the trace buffer is a circular trace buffer which is limited in size, for example, to 16 or 32 MB. Due to this limited size or capacity, trace routines which place trace data into the trace buffer manage the trace buffer as a circular queue and are thus able to continually write trace data to the trace buffer. For example, a software developer may define a number of trace events for which trace data is to be produced during trace mode operation of a software program under test within a data storage system. During operation of the software program in trace mode, as each trace event occurs, the software program activates one or more trace routines which place (i.e., write) a certain amount of trace data into the trace buffer.

Depending upon the frequency of occurrence of the trace events (i.e., the time between traced events), or the size or amount of trace data written for each trace event to the trace buffer, and/or how long (e.g., how much time) or how fast or slow the software program continues to operate in trace mode, trace routines may place trace data into the trace buffer at varying rates and in various amounts. The trace buffer may become completely full with trace data at some point during the operation of the software program in trace mode. That is, so much trace data may be created that the trace buffer area in the cache memory is fully consumed with trace data. However, since conventional trace routines operate the trace buffer as a circular trace buffer, the routines that produce the trace data begin to re-write trace data at the start of the trace buffer if the trace buffer becomes completely full with trace data. Stated differently, once the trace buffer is filled with trace data, conventional trace routines begin to overwrite any existing trace data at the beginning of the trace buffer with the most recently generated (i.e., the newest) trace data. The trace routines continue in this manner by writing trace data generated for each trace event at a location in the trace buffer corresponding to the end of the most recently written portion of trace data. This is problematic since trace data may be lost (i.e., overwritten) after the trace routines begin overwriting old trace data at the start of the trace buffer with new trace data.

Conventional trace routines, which are typically incorporated as part of the software control program operating in trace mode within the data storage system, maintain a trace buffer pointer indicating the current location to which any new trace data is to be written upon the occurrence of the next trace event. Each time a trace routine adds trace data to the trace buffer, the trace routine updates the trace buffer pointer to the point to the end of the trace data in the trace buffer.

Another problem with the conventional approach to accessing trace data in a data storage system is that a software developer may be limited in the amount of time that he she is able to operate a software program in trace mode while still being able to accurately capture trace data from the trace buffer after halting operation of the software program. If a software developer allows the software program to operate for too much time, older trace data in the trace buffer that trace routines generate during the early stages of operation of the software program may likely be overwritten by trace data generated in later stages of operation of the software program. Thus, trace data can be lost and it is difficult to perform an accurate analysis of prolonged operation of the software program due to the problem of incomplete or missing (i.e., overwritten) trace data.

Likewise, conventional trace data access techniques tend to restrict the number of different trace events that a software developer can select for capture of trace data during trace mode operation of a software program. This is because each trace event causes a certain amount of trace data to be placed into the trace buffer. Some events may cause trace routines to capture large amounts of trace data while other events may require the capture of only limited amounts of trace data. Accordingly, if trace data for many different trace events is to be captured in the trace buffer during trace mode operation of a software program, or if a small number of trace events are selected but each trace event produces large amounts of trace data, the software developer may be inclined to only operate the software control program in trace mode for a short period of time in at attempt to avoid the problem of trace data being overwritten in the trace buffer, as explained above.

To illustrate these problems further, it is difficult if not impossible to select a large number of trace events for which trace data is to be generated during operation of a software program in trace mode, and then to perform the software program in trace mode in a data storage system for a prolonged period of time (e.g., many hours or days) under heavy load conditions, without exhausting the initial capacity of the trace buffer thus causing the loss (e.g., the overwriting) of trace data. Accordingly, conventional approaches to accessing trace data in a data storage system provide very limited ability to perform long-term analysis of extended data storage system control program operation by collecting trace data generated for many different trace events during such an extended data storage system operation.

Further still, even if the problems of overwriting trace data and limited trace buffer capacity are not of a major concern for a software developer using conventional trace data access approaches, such conventional trace data access approaches provide limited access to the trace data by computer systems other than the data storage system (e.g., via a service processor computer system which is directly coupled and highly integrated into the data storage system) in which the trace data is generated. Using conventional trace data access approaches, the software developer must establish and configure trace events on the service processor, which is typically a console interface that is physically integrated into the data storage system. The service processor does not typically provide an interface for accessing the trace data in a remote manner.

The software developer must thus activate trace mode operation of the data storage system in trace mode while being physically present at the data storage system. Upon completion of the operation of the software program in trace mode, the software developer can then manually download or otherwise copy the trace data from the service processor in the data storage system to a removable media such as a disk which is then printed for analysis at a remote location. Other conventional trace data access alternatives include capturing a screen copy or "dump" of the trace data in the trace buffer via the service processor, once the software program operating in trace mode has been halted.

Embodiments of the present invention significantly overcome these and other deficiencies associated with conventional data storage system trace data access techniques. In particular, embodiments of the invention provide mechanisms and techniques which allow for the continuous and substantially real-time capture of trace data during operation of a software program in trace mode in a data storage system without concern for the effects of trace data being overwritten by more recently generated trace data in the trace buffer. Using embodiments of the invention, a software developer need not be overly concerned about defining too many trace events which may occur to completely fill the trace buffer with trace data prior to being able to extract the trace data from the trace buffer. In other words, embodiments of the invention allow a software developer to define as many or as few trace events as necessary to properly test and analyze the operation of a software program in a data storage system without concern for conventional trace buffer and trace data access limitations.

Embodiments of the invention can also access trace data in a trace buffer in an automatic, real-time and dynamically adjustable manner such that if trace events begin to occur in rapid succession, the techniques of embodiments of the invention which operate to capture and access such trace data will keep pace with the more rapid creation of the trace data in a trace buffer. As will be explained, by providing a dynamically adjustable adaptive timing algorithm, if trace data begins to rapidly fill a trace buffer, embodiments of the invention can speed up trace data access to keep pace and extract the trace data at a rate which is substantially commensurate with the rate at which the trace data is placed into the trace buffer. Accordingly, if trace routines begin to overwrite trace data beyond the end of the trace buffer thus overwriting older trace data formerly written to the beginning of the trace buffer, embodiments of the invention operate to capture the older trace data prior to it being overwritten with newer trace data. In this manner, the system of the invention can allow a software program in a data storage system to operate indefinitely in trace mode while continually adapting and capturing trace data placed into the trace buffer. This allows trace data to be accurately captured for prolonged periods of operation of a software program in trace mode in a data storage system.

Embodiments of the invention also provide for the ability to remotely access (e.g., read and extract from the data storage system) the trace data without requiring a software developer to manually download or copy trace data from the service processor console on a data storage system. In particular, embodiments provide an event trace system call or routine implemented within a data storage system (e.g., implemented as an additional trace routine) that can be remotely activated and operated by a trace capture process performing (e.g., executing), for example, on a host computer system coupled to the data storage system. The event trace routine operates in the data storage system to access trace data in the trace buffer and can return the trace data to the trace capture process. The event trace routine is also able to return the current value of a trace buffer pointer. Using the event trace routine, the trace capture process can operate in a remote host computer system to either obtain the value of the current trace buffer pointer and/or to obtain trace data from the trace buffer.

An interface (e.g., system call interface providing parameters) to the event trace routine allows for a specification of a location at which to begin reading trace data from the trace buffer, as well as an amount of trace data that is to be read beginning at that location. If these parameter values are set to a predetermined value (e.g., are both set to 0), then the event trace routine returns the current value of the trace buffer pointer and no trace data is returned. Alternatively, if values are specified for a trace buffer pointer location and an amount of data to read, then the event trace routine returns the amount of trace data from the specified location.

Using this system call interface, a remotely operating trace capture process can detect advancement of the trace buffer pointer via call(s) to the event trace routine, and can then use the event trace routine access trace data placed into the trace buffer as a result of the advancement of the trace buffer pointer. Since the system call can be activated remotely by one or more host computer systems operating one or more trace capture process(es) configured according to embodiments of the invention, trace data can be extracted from the trace buffer and transmitted to the trace capture process(es) operating within the host computer system(s) that is/are distant or remotely located from the data storage system. The trace data can then be stored remotely for analysis of the performance of the software control program(s) that produced the trace data.

In particular, the system of the invention provides method embodiments which include a method for accessing trace data produced in a data storage system. The method comprises detecting availability of trace data in a trace buffer in a data storage system and in response to detecting, providing at least one request for the trace data in the trace buffer. The method then receives the trace data from the trace buffer in response to the at least one request and repeats the steps of detecting, providing at least one request and receiving the trace data such that trace data is continually accessed from the trace buffer. Using this method, embodiments of the invention are able to extract trace data when availability within the trace buffer is detected, thus preventing the problem of conventional trace data access systems which encounter the loss of trace data due to limited trace buffer capacity.

In one embodiment, the step of detecting availability of trace data in the trace buffer includes the steps of querying the data storage system to determine if trace data has been placed in the trace buffer, and if trace data has been placed in the trace buffer, proceeding to perform the steps of providing, receiving, and repeating, and if trace data has not been placed in the trace buffer, waiting a predetermined amount of time and repeating the step of querying. Such a query may retrieve trace buffer pointer information which can be compared with previous values of the trace buffer pointer to determine if the trace buffer pointer has moved, thus indicating the presence of additional trace data in the trace buffer. The predetermined amount of time to wait between such queries may be determined by an adaptive timing algorithm which can adjust the amount of time to wait based on factors such as the amount of trace data added to the trace buffer, a number of trace events for which trace data is produced, a speed of performance of a software program which produces the trace data, or other factors.

In one embodiment, the step of providing a request for a value of the trace buffer comprises the step of providing a call (e.g., a system call such as a remote procedure call or RPC) to an event trace operation in the data storage system. The event trace operation, which may be a routine embedded in the operating program or microcode of a data storage system, can return a value for the trace buffer pointer equal to a current trace buffer pointer position in the trace buffer in the data storage system.

In another embodiment, the step of providing at least one request for the trace data in the trace buffer comprises the steps of providing a call to an event trace operation in the data storage system. In this embodiment, the event trace operation receives at least one request for the trace data in the trace buffer, and in response to the at least one request, the event trace operation performs the steps of accessing the trace data from the trace buffer in the data storage system returning the trace data accessed from the trace buffer in response to the step of accessing.

As such, the event trace operation can either return just the trace buffer pointer value or, if requested, can return this value in addition to trace data read from the trace buffer.

In one embodiment, the general operation can be performed remotely for the data storage system such that the steps of detecting availability of trace data in a trace buffer, providing at least one request for the trace data, and receiving the trace data from the trace buffer are performed by a trace capture process operating in host computer system coupled to the data storage system, while the event trace operation is performed (e.g., via a remote system call from the trace capture process) in the data storage system to extract trace data from the data storage system that a processor in the data storage system places in the trace buffer in response to detecting a trace event.

To perform the step of providing at least one request for the trace data in the trace buffer, one embodiment comprises the steps of calculating an amount of trace data to be requested from the trace buffer based upon a value of a current trace buffer pointer associated with the trace buffer in the data storage system and a previous trace buffer pointer. Then to retrieve trace data, the request for the trace data received by the event trace operation indicates the amount of trace data calculated by the step of calculating such that the event trace operation accesses the trace data in the trace buffer according to the amount of trace data.

In the data storage system, the trace buffer in one embodiment is a circular trace buffer and the step of providing at least one request for the trace data in the trace buffer further comprises the steps of determining that an amount of trace data available in the trace buffer extends at least from an end of the trace buffer to a start of the trace buffer. In this instance, this embodiment can detect when trace data has completely filled the trace buffer and is currently being written (i.e., by a software program operating in trace mode) beginning at the start of the trace buffer so as to overwrite older trace data in the trace buffer. Accordingly, this embodiment provides a first request for a first portion of trace data from the trace buffer in which the first request specifies access to trace data from a previous trace buffer location to the end of the trace buffer, and then provides a second request for a second portion of trace data from the trace buffer. The second request specifies access to trace data from a start of the trace buffer to a current trace buffer location. In this manner, even if trace data is written beyond the end of the trace buffer, the system of the invention is able to detect this and is able to access all trace data in the trace buffer.

In one embodiment, the operation of the trace capture process can also establish trace events for which the data storage system is to generate trace data in the trace buffer and can activate event tracing to cause the data storage system to begin detecting trace events for which trace data is generated and placed in the trace buffer. The trace capture process can also store the trace data in a trace database in response to the step of receiving the trace data.

Other method embodiments of the invention operate within a data storage system. In particular, one such method embodiment provides trace data to a host computer system by detecting a trace event and in response to detecting the trace event, placing trace data associated with the trace event in a trace buffer. The method in a data storage system also receives at least one request for the trace data from a remote computer system and in response to the at least one request, forwards the trace data from the trace buffer to the remote computer system. The method also consecutively performs the steps of detecting, placing, receiving and forwarding at a rate such that trace data placed into the trace buffer is forwarded to the remote computer system. A similar embodiment of the invention performs these steps or operations completely within a data storage system such that the request in response for trace data occurs within the data storage system instead of with (i.e., to or from) the remote computer system.

In other method embodiments within a data storage system, the request is a call to activate an event trace routine in the data storage system. The event trace routine performs the operation of receiving the request for the trace data. The request includes a trace buffer read position and an amount of trace data to read from the trace buffer. The event trace routine determines if trace data requested is for a value of a current trace buffer pointer, and the trace routine obtains the current trace buffer pointer value and returns the value of the current trace buffer pointer and the trace data. Alternatively, if the request includes a specification of trace data to read from the trace buffer (for example, by indicating an amount of trace data to read by indicating a location and an amount in which to read trace data from the trace buffer), then the event trace routine reads trace data from the trace buffer, beginning at a trace buffer read position specified in the request, until an amount of trace data as specified in the request is read from the trace buffer and returns the current trace buffer pointer and the trace data read from the trace buffer.

Other embodiments of the invention include a computerized device, such as a host computer system, configured to access trace data according to the trace capture process operations disclosed herein as embodiments of the invention. In such embodiments, the computerized device includes at least one interface, such as a host interface, coupled to a data storage system, a processor, a memory encoded with a trace capture application, and an interconnection mechanism coupling the processor, the at least one interface, and the memory. In embodiments of the computerized device, the processor performs the trace capture application in the memory to provide a trace capture process, that when performed, causes the computerized device to access trace data according to the method embodiments of the invention.

Other embodiments of the invention include data storage systems equipped to perform the method operations disclosed herein as embodiments of the invention. That is, embodiments of the invention include a data storage system equipped with either an event trace routine which operates as explained herein, or alternatively, a data storage system equipped with both an event trace routine operating as explained herein in addition to a trace capture process which also operates (e.g., executes) within the data storage system in which works in conjunction with the event trace routine the capture trace data.

In particular, in one embodiment, a data storage system is provided which includes at least one interface, a cache memory encoded with a trace buffer, at least one processor operating a software program in trace mode, and an interconnection mechanism coupling the at least one interface, the cache memory and the at least one processor. In such embodiments of a data storage system, the processor(s) performs at least one trace routine including an event trace routine to cause the data storage system to perform according to the event trace routine operations explained herein as embodiments of the invention.

Other arrangements of the invention that are disclosed herein include software programs to perform the method embodiment operations summarized above and disclosed in detail below. More particularly, a computer program product is disclosed which has a computer-readable medium including computer program logic encoded thereon to provide access to trace data. The computer program logic, when executed on at least one processor with a computing system, causes the processor to perform the operations (e.g., the methods) indicated herein as embodiments of the invention. Such arrangements of the invention are typically provided as software, code or other data on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within EMC's Symmetrix line of data storage systems and software manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Embodiments of the present invention provide unique mechanisms and techniques to allow automated, continuous, remote and substantially real-time access to trace data produced within a trace buffer in a data storage system. Embodiments can operate concurrently during execution of one or more software programs in trace mode in the data storage system to produce such trace data.

In particular, preferred embodiments of the invention provide a trace capture process which may perform either in a remotely operating host computer system coupled to a data storage system, or which may perform within a data storage system itself (e.g., within a service processor console in the data storage system). The data storage system is equipped with an event trace routine configured according to embodiments of the invention which is able to access trace data and/or trace buffer pointer information for a trace buffer when called upon to do so by the trace capture process. Using the event trace routine, the trace capture process can determine (e.g., via a call to this routine) when new trace data is available in the trace buffer in the data storage system, for example, by detecting advancement of a trace buffer pointer. The trace capture process can then use the event trace routine to access (i.e., to read) the trace data in the trace buffer and to obtain an update on the current value of the trace buffer pointer. By keeping track of previous and current trace buffer pointer locations and how frequently the trace buffer pointer changes, the trace capture process can determine exactly how much, and how frequently, trace data is written to or added to the trace buffer during operation (e.g., execution) of one or more software programs in trace mode in the data storage system.

Embodiments of the trace capture process can adjust the frequency or timing between calls to the event trace routine to obtain trace data from the trace buffer at a rate sufficient enough to avoid trace data being overwritten in the trace buffer. The timing between calls to the event trace routine can be adjusted dynamically according to an adaptive timing algorithm which can take into account such factors as the number of events being traced, the amount of trace data created during the occurrence of such trace events, and the speed at which, and length of time during which the software program operating in trace mode is allowed to perform. Embodiments of the invention can thus remotely capture trace data over prolonged periods of performance of software programs that operate in trace mode in a data storage system without software developers having to interrupt the software programs in order to manually capture the trace data.

Figure 1:
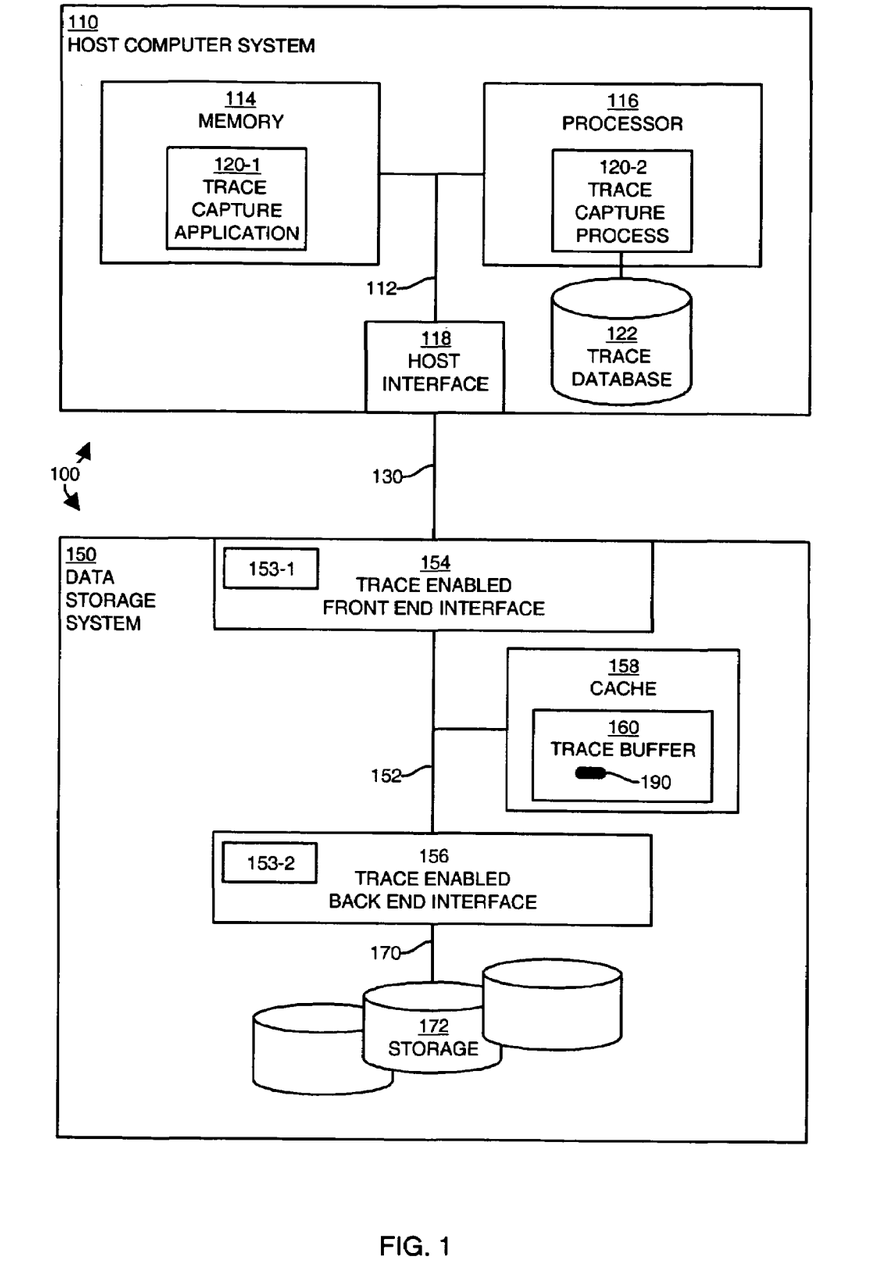
FIG. 1 illustrates an example computing system environment including a host computer system coupled to a data storage system configured according to embodiments of the invention.

FIG. 1 illustrates an example of a computing system environment 100 configured in accordance with embodiments of the invention. The computing system environment 100 includes a host computer system 110 coupled via a data interface 130 to a data storage system 150. It is to be understood that the configuration shown in FIG. 1 is shown by way of example only, and other configurations are possible as well.

In this example, the host computer system 110 includes an interconnection mechanism 112 coupling a memory 114, a processor 116 and a host interface 118. The host computer system 110 may be any type of computer system or computerized device such as workstation, personal computer, dedicated computer system, network analyzer or the like. While not specifically shown in this figure, it is to be understood that a typical host computer system 110 includes an operating system software program configured within the memory 114 that can operate (e.g., executes) on the processor 116. It is also to be understood that there may be more than one host computer system 110 operating according to embodiments of the invention.

With regards to embodiments of the invention in the host computer system 110, the memory 114 is also encoded with logic instructions such as software application code and/or data which collectively form a trace capture application 120-1 configured in accordance with embodiments of the invention. The processor 116 can access the logic instructions that form the trace capture application 120-1 via the interconnection mechanism 112 to the memory 114 in order to perform (e.g., execute, run, interpret or otherwise operate) such logic instructions. When this happens, a trace capture process 120-2 is formed via the combination of the logic instructions of the trace capture application 120-1 operating on the processor 116. In other words, the trace capture application 120-1 represents an embodiment of the invention in a computer readable medium such as the memory 114, which includes logic instructions that when performed on the processor 116, provide an embodiment of the invention referred to herein as the trace capture process 120-2. During operation, the trace capture process 120-2 can access a trace database 122 in order to store trace data, as will be explained.

The data storage system 150 includes an interconnection mechanism 152 which couples a trace enabled front end interface 154, a trace enabled back end interface 156 and a cache 158 (e.g., a cache memory system). In this example embodiment, the cache 158 is encoded with a trace buffer 160 (e.g., a data structure) which is able to store trace data 190. The trace enabled back end interface 156 includes a coupling 170 to one or more storage devices 172 which may be disk drives, tape drives, or any other storage media. According to the general operation of the data storage system 150, the trace enabled front end interface 154 couples to the data interface 130 to process data access requests (not specifically shown) on behalf of host computer systems (e.g., 110 and others, not specifically shown) for access to data stored within the data storage system 150. The trace enabled back end interface 156 handles data access operations related to data stored within the storage devices 172. An example implementation of the data storage system 150 is a Symmetrix data storage system manufactured by EMC Corporation of Hopkinton, Mass., USA.

While FIG. 1 only illustrates one data storage system 150 for ease of description of embodiments of the invention, it is to be understood that there may be many data storage systems 150 that operate according to such embodiments. Furthermore, while not shown in detail, it is to be understood that data interface 130 that couples the host computer system(s) 110 to the data storage system(s) 150 may be any type of connection mechanism such as a high speed peripheral data interface such as a SCSI connection, Fibre Channel connection, or the like, or the data interface 130 may comprise data communications devices and data links that form a storage area network (SAN).

Within the data storage system 150, the trace enabled front end interface 154 and the trace enabled back end interface 156 are called "trace enabled" interfaces since each represents at least one processor which can perform a respective software program 153-1, 153-2 that can each operate in trace mode to produce the trace data 190 within the trace buffer 160. For purposes of the descriptions of embodiments of this invention, it is not particularly important which processor (one or more) operating a software program 153 (e.g., 153-1 or 153-2) within the data storage system 150 produces the trace data 190 in a trace buffer 160. To this end, the software programs 153-1 and 153-2 may be different and may operate separately or together to produce trace data 190 separately or concurrently. In this example then, such trace data 190 may be produced and placed into the trace buffer 160 from either the front end or back end interfaces 154 or 156. It is to be understood that these processors 154, 156 operating the software programs 153-1, 153-2 are illustrative only and that any processor within any component (e.g., a processor operating perhaps within a storage device 172) in the data storage system 150 may produce the trace data 190 in the trace buffer 160.

Figure 2A:
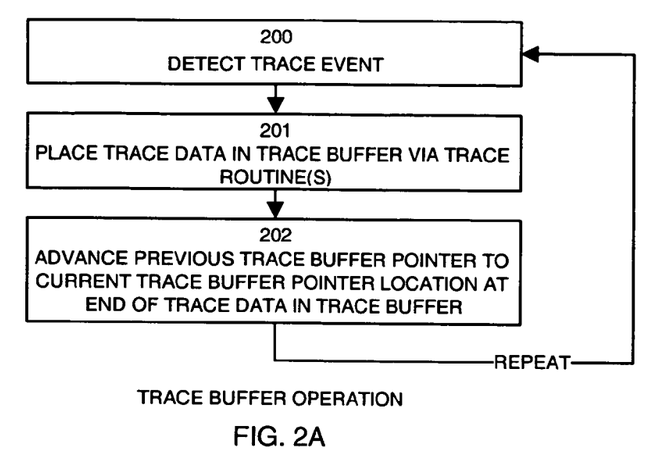
FIG. 2A is a flow chart of processing steps that show how trace data is created upon occurrence of trace event(s) and how the trace data is placed into a trace buffer in a data storage system.

FIG. 2A is a flow chart of processing steps which show the general operation of a software program 153 operating on a processor such as the trace enabled front end and/or back end interface processors 154, 156 to produce trace data 190 within the trace buffer 160.

In step 200, the software program 153 detects a trace event. The trace event may be any event or operation within the software program 153 for which a software developer has designated that a trace routine (not specifically shown) that is to operate upon detection of the trace event to produce trace data 190.

Next, in step 201, the software program 153, via operation of a trace routine associated with the trace event, places the trace data 190 into the trace buffer 160.

In step 202, the software program 153 advances a trace buffer pointer (not specifically shown in FIG. 1) from a previous trace buffer pointer location to a current trace buffer pointer location indicating the end of the trace data 190 within the trace buffer 160. As will be explained shortly, trace routines which are responsible for detecting trace events and capturing trace data for placement into the trace buffer 160 are able to update the trace buffer pointer which points to, or otherwise indicates a location at which to place trace data 190 into the trace buffer 160 upon the occurrence of each trace event. The software program 153 thus updates the trace buffer pointer in step 202 and then returns to step 200 in order to detect the next occurrence of another trace event.

In this manner, a software program 153 operating in trace mode within the data storage system 150 is able to operate, and upon occurrence of user specified events, can trigger a trace routine to place the trace data 190 into the trace buffer 160. Using embodiments of the invention which will be explained next, the processing operations shown in FIG. 2A can continue for prolonged periods of time without concern for filling the trace buffer 160 with excessive amounts of trace data 190.

Figure 2B:
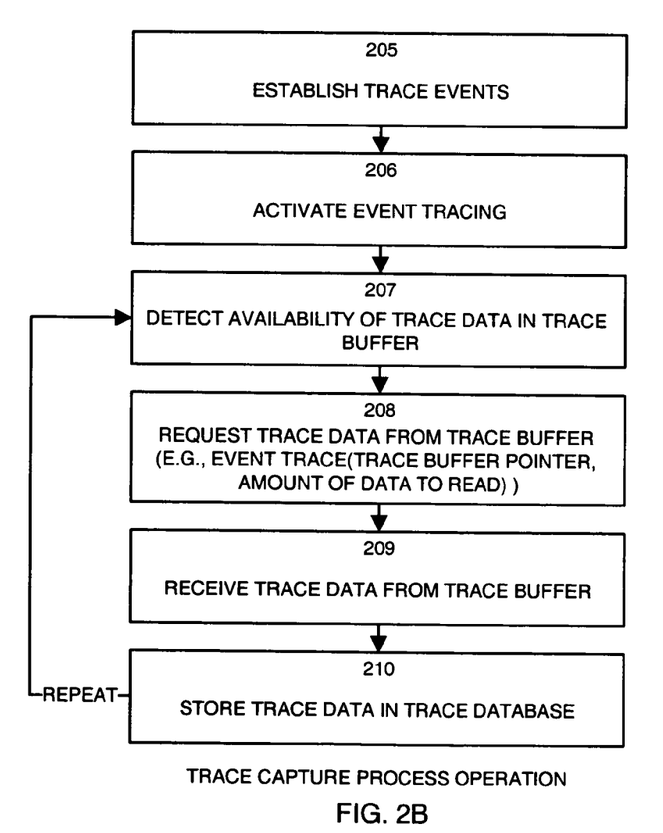
FIG. 2B is a flow chart of processing steps that show the operation of a trace capture process configured according to embodiments of the invention.

FIG. 2B is a flow chart of processing steps which show the general processing operations provided by a trace capture application 120-1 (FIG. 1) when performing (e.g., executing) on the processor 116 as the trace capture process 120-2. In other words, the processing steps in FIG. 2B show the general operation of the trace capture process 120-2 which provide access to the trace data 190 from the host computer system 110.

In step 205, the trace capture process 120-2, which is typically under the control of a software test developer (not shown), establishes trace events (not specifically shown) for which the software program 153 will trigger a trace routine.

By way of example, a software developer may be interested in analyzing the performance of the trace enabled front end interface 154 while handling SCSI commands over the data interface 130. Since the software program 153-1 in the data storage system 150 is responsible for controlling the general operation of the trace enabled front end interface 154, the software developer might perhaps establish one or more trace events related to the processing of SCSI commands by the software program 153-1. As a specific example, the software developer might establish a trace event to capture trace data related to SCSI interface Command Descriptor Blocks (CDBs) which are transferred across the data interface 130 between host computer system(s) and the data storage system 150.

Next, in step 206, the software developer activates event tracing by starting software programs 153-1 and 153-2 in trace mode on the data storage system 150 followed by the trace capture process 120-2 on the host computer 110. The aforementioned procedure causes the software program 153-1 to perform using the processing and functionality described above with respect to FIG. 2A.

As the software program 153-1 operates in trace mode (i.e., operates with event tracing activated), trace data 190 will, at some point during the operation of the software program 153-1, begin to appear in the trace buffer 160. The exact time and rate at which the trace data 190 appears in the trace buffer 160 may be determined by a number of factors such as the number of trace events that the software developer establishes, the frequency of occurrence of trace events, the speed at which the software program 153 performs, the amount of trace data 190 that a trace routine captures for a particular trace event, and possibly other factors. For example, if a software developer establishes trace events for processing operations which frequently occur within the software program 153 and these operations are frequently exercised during performance of the software program 153 in trace mode, then it is likely that trace data 190 will rapidly appear within the trace buffer 160. Conversely, if trace events are established for certain processing tasks which are rarely encountered during normal operation of the software program 153, trace data 190 may appear in the trace buffer 160 less frequently.

In step 207, the trace capture process 120-2 detects availability of trace data 190 in the trace buffer 160. There are a number of techniques which embodiments of the invention can provide to perform the detection of trace data 190 which appears in the trace buffer 160. Details of certain of such mechanisms and techniques will be explained shortly.

In step 208, the trace capture process 120-2, in response to detecting availability of trace data 190 in the trace buffer 160, requests the trace data 190 from the trace buffer 160 within the data storage system 150. In a preferred embodiment of the invention, such a request for the trace data 190 in step 208 is performed using a system call to an event trace routine provided by embodiments of the invention (not specifically shown in FIG. 1) that operates within the data storage system 150 to access (e.g., read) the trace data 190 from the trace buffer 160.

In response to the request made to the trace capture process 120-2 in step 208, the event trace routine operating in the data storage system 150 accesses the requested trace data 190 (as will be explained) and then passes back or returns the trace data 190 to the trace capture process 120-2 via the data interface 130 interconnecting the host computer system 110 in the data storage system 150.

At this point, in step 209, the trace capture process 120-2 receives the trace data 190 accessed via the event trace routine from the trace buffer 160 in the data storage system 150.

In step 210, the trace capture process 120-2 stores the trace data 190 in the trace database 122 for analysis of the performance of the software program 153 for which the trace data 190 was produced. After processing the functionality shown in step 210, the trace capture process 120-2 repeats the aforementioned processing by returning to step 207 to begin again the process of detecting availability of new trace data 190 placed into the trace buffer 160.

The trace capture process 120-2 thus can continually repeat the processing of steps 207 through 210 in order to extract trace data 190 continuously and remotely as it is entered or added into the trace buffer 160 during operation of the software program 153 in trace mode. Since the trace capture process 120-2 in this embodiment operates within the host computer system 110, there is little interference or disruption within normal operation of the software program 153 operating in trace mode. To this end, the repetitive processing operations shown in steps 207 through 210 shown in FIG. 2B preferably operate concurrently and asynchronously with the software program 153 operating in trace mode, which concurrently performs the processing operations 200 to 202 shown in FIG. 2A and as explained above. It is to be understood, however, that the trace capture process 120-2 can, in certain embodiments, be implemented and operated on a processor within the data storage system 150 in order to capture trace data 190 locally. The processor may happen to be the same processor that operates the software program 153 that generates the trace data 190.

Figure 3:
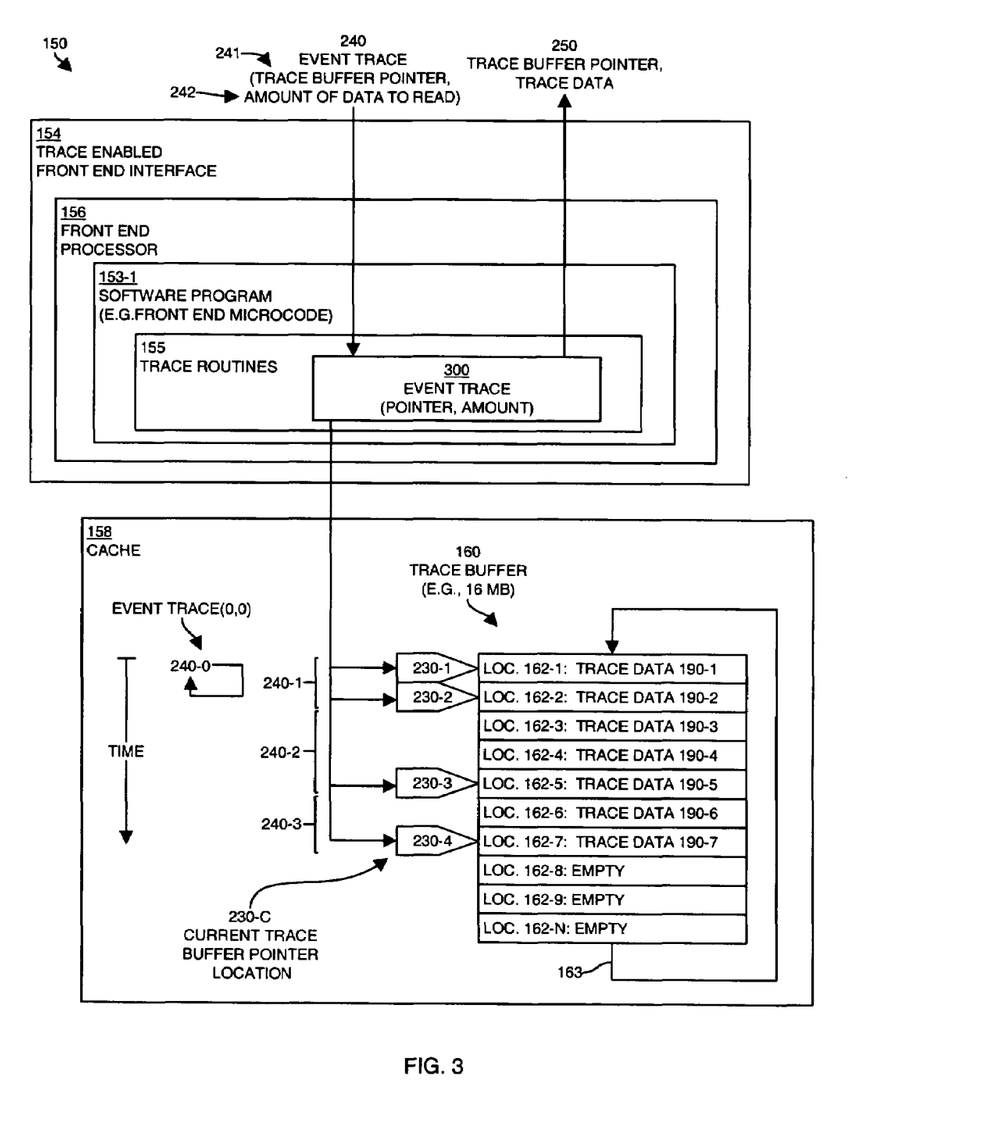
FIG. 3 illustrates a more detailed example of interaction between a trace capture process, an event trace routine and a trace buffer within a cache memory in a data storage system configured according to embodiments of the invention.

FIG. 3 illustrates a more detailed example of the internal operation and interaction between a trace enabled front end interface 154 and a cache 158 containing a trace buffer 160 as operating according to embodiments of the invention. As illustrated, the trace enabled front end interface 154 includes a front end processor 156 which performs (e.g., executes, interprets, runs or otherwise operates) the software program 153-1, which in this example is front end microcode or logic instructions which control the general operation of the front end interface 154. The software program 153-1 includes or otherwise has access to (e.g., can call) trace routines 155 which include an event trace routine 300 configured according to embodiments of the invention.

As explained above with respect to FIG. 1, the trace capture process 120-2 (FIG. 1) can generate a system call 240 to the event trace routine 300. In this example, the system call 240 to the event trace routine 300 includes two parameters: a trace buffer pointer, and an amount of data to read from the trace buffer. When the trace capture process 120-2 generates the system call 240 to the event trace routine 300, the event trace routine 300 processes the system call 240, as will be explained in FIG. 6, and returns a response 250 which includes a current value of the trace buffer pointer, and optionally, as will also be explained, trace data 190.

Attention is directed now to FIG. 3 and specifically to the interaction between event trace routine 300 and the cache 158 containing the trace buffer 160. In this example, the trace buffer 160 includes a plurality of trace buffer locations 162-1 through 162-N. Each trace buffer location 162 is capable of storing trace data 190. In this example, which illustrates the state of the trace buffer 160 after operation of the software program 153-1 after some period of time during which trace events have previously occurred, trace buffer locations 162-1 through 162-7 contain (i.e., store) respective portions of trace data 190-1 through 190-7. At the state of processing as illustrated in this figure, trace buffer locations 162-8 through 162-N do not yet contain trace data and are thus indicated as being EMPTY.

FIG. 3 also illustrates various trace buffer pointers 230-1 through 230-4. The trace buffer pointers 230 illustrated in this example represent the point of entry (i.e., the starting points and ending points) of various amounts (i.e., multiple portions) of trace data 190 which have been incrementally written to the trace buffer 160 during operation of the software program 153-1. The illustration shown in FIG. 3 thus represents a snapshot of the trace buffer 160 as it appears a point in time after a certain amount of processing has occurred in the software program 153-1 while performing on the front end processor 156.

By way of example, the first trace buffer pointer 230-1 represents the first location of the trace buffer pointer as of the start of the trace mode operation of the software program 153-1. While not shown here, at the start of the trace mode operation of the software program 153-1, all of the trace buffer locations 162 were empty. At some point into the processing operation of the software program 153-1 (i.e., during operation of the processing in FIG. 2A), upon the occurrence of the first trace event, a trace routine 155 placed or wrote the portions of trace data 190-1 and 190-2 into the respective trace buffer locations 162-1 in 162-2 and also advanced the location of the trace buffer pointer to the position at 230-2. As the software program 153-1 progressed further, another trace event occurred causing a trace routine 155 to place the portions of trace data 190-3 through 190-5 into the respective trace buffer locations 162-3 through 162-5 and further caused the advancement of the trace buffer pointer to the location 230-3. Finally, to arrive at the configuration illustrated in FIG. 3, the software program 153-1 continued to operate and encountered another trace event which caused the trace routine 155 to place portions of trace data 190-6 in 190-7 into respective trace buffer locations 162-6 in 162-7 and caused the advancement of the trace buffer pointer 230 to trace buffer pointer location 230-4, which in this example configuration is also called the current trace buffer pointer 230-C, as this is the last trace buffer location 162 which has received a portion of trace data 190. With respect to the location of any trace buffer pointer 230, a previous trace buffer pointer for purposes herein is the trace buffer pointer 230 that immediately proceeds (i.e., that is less than) the current trace buffer pointer 230-C.

Generally, according to the operation of embodiments of the invention, the event trace routine 300 is able to access to trace buffer 160 within the cache 158 in response to a system call 240. The event trace routine 300 can then access or obtain a current value or position of the trace buffer pointer 230, as well as the portions of trace data 190 within trace buffer locations 162 as specified in the system call 240. The trace capture process 120-2 can use the particular trace buffer pointer locations 230 (as returned in response 250 to the systems calls 240) to sequentially access trace data 190 with each successive system call 240 to the event trace routine 300, as illustrated by the system call numerals 240-0 through 240-3 in FIG. 3.

Figure 4:
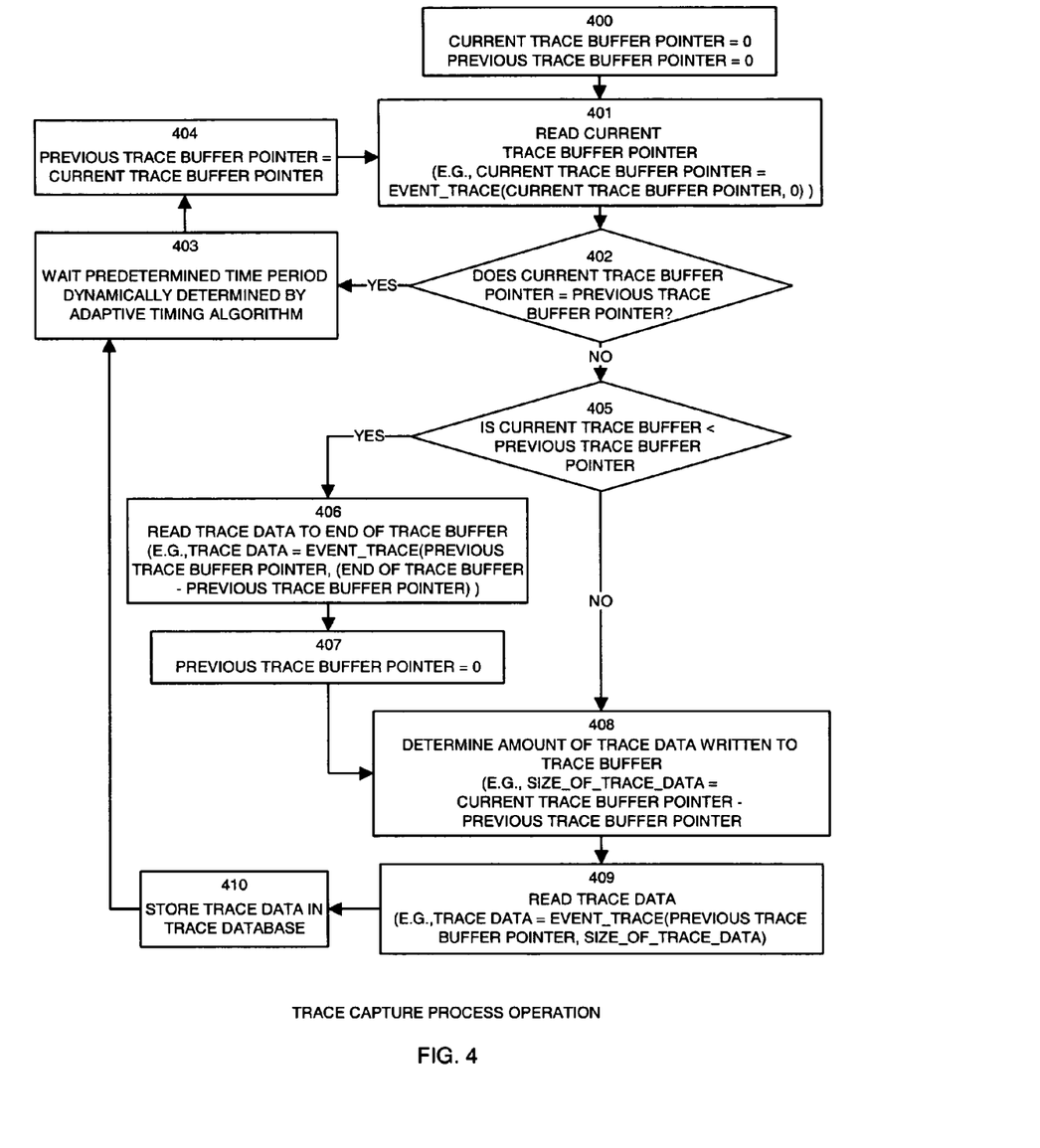
FIG. 4 is a flow chart of processing steps that show details of an operation of a trace capture process configured according to embodiments of the invention.

FIG. 4 is a flow chart of processing steps which shows details of an operation of an example embodiment of the trace capture process 120-2 on a host computer system 110 (and thus also illustrates a representation of the logic instructions which form the trace capture application 120-1 in FIG. 1 according to an embodiment of the invention). Generally, the processing steps shown in FIG. 4 represent additional details of the general processing cycle shown in steps 207 through 210 in FIG. 2B. For the operations or steps in FIG. 4 however, it is assumed that a software developer has already performed steps 205 and 206 in FIG. 2B to establish the trace events and to activate event tracing within the software program 153-1, which is now operating in trace mode according to the processing shown in FIG. 2A. The steps in FIG. 4 will be explained in part with reference to the example configuration of the data storage system 150 shown in FIG. 3.

In step 400, the trace capture process 120-2 initializes a current trace buffer pointer variable and a previous trace buffer pointer variable to a null value such as zero. The trace capture process 120-2 in the host computer system 110 maintains previous and current trace buffer pointer variables (not shown in the illustrations in FIG. 1 or 3) in order to be able to determine when and how much trace data 190 is added to the trace buffer 160 in a data storage system 150.

In steps 401 through 404, the trace capture process 120-2 generally detects the availability of trace data 190 in the trace buffer 160 by querying the data storage system 150 to determine if any trace data 190 has been placed into the trace buffer 160 (e.g., since the last query). If trace data has been placed in the trace buffer, the trace capture process 120-2 proceeds to access the trace data 190, whereas if trace data 190 has not been placed into the trace buffer 160, the trace capture process 120-2 waits a predetermined amount of time and repeats the process of steps 401 through 404.

More specifically, in step 401, the trace capture process 120-2 can query the data storage system 150 by providing a request for a value of the current trace buffer pointer 230-C (FIG. 3), for example, by activating the system call 240-0 (FIG. 3) to the event trace routine 300 that performs in the data storage system 150. For each system call 240-0 in step 401, the trace buffer pointer parameter 241 (FIG. 3) is set to "0" and the amount of data to be read parameter 242 also set to "0". As will be explained, when the event trace routine 300 is activated with a system call 240 (e.g., 240-0) with at least one of the parameters 241, 242 set to "0" (e.g., preferably, and in this particular example, the amount of data to read parameter 242 is set "0"), then the event trace routine 300 only returns the current value of the trace buffer pointer 230-C and returns no trace data 190. In this manner, the event trace routine 300 can be called by the trace capture process 120-2 to obtain the value of current trace buffer pointer 230-C without actually returning trace data 190.

Next, in step 402, the trace capture process 120-2 determines if the value of the current trace buffer pointer variable equals the value of the previous trace buffer pointer variable. Recall that in step 400, both the current trace buffer pointer and previous trace buffer pointer variables were initialized to "0." Accordingly, if in step 401, the system call 240-0 (FIG. 3) to the event trace routine 300 obtains a value of the current trace buffer pointer variable other than "0," then this is an indication that trace data 190 was added to the trace buffer 160. If the current trace buffer pointer equals the previous trace buffer pointer in step 402, then no advancement of the current trace buffer pointer 230 (FIG. 3) has taken place in the cache 158 and thus no trace data 190 has been placed in the trace buffer 160 at this point and processing proceeds to step 403.

In step 403, the trace capture process 120-2 waits (e.g., performs a delay process operation) a predetermined time period dynamically determined by an adaptive timing algorithm before proceeding back to step 401 to query the trace buffer point again.

An adaptive timing algorithm according to embodiments of the invention generally controls the frequency at which the trace capture process 120-2 accesses trace data 190 from the trace buffer 160 based on detecting advancement of the trace buffer pointer. The frequency or rate at which such trace data accesses occur can be based on factors such as the speed of operation of the software program 153-1, the number of events selected for tracing, the frequency of occurrence of the events being traced, and the amount of trace data 190 placed into the trace buffer upon each advancement of the trace buffer pointer, among other factors.

By way of example, the trace capture process 120-2 can determine the amount of trace data 190 placed into the trace buffer 160 for use by the adaptive timing algorithm by comparing any difference that may exist between the previous and current trace buffer pointer variables. If such a difference exists, the difference (e.g., in bytes, blocks, memory locations, or the like) represents the amount of trace data added or written to the trace buffer 160 since the last operation of accessing trace data 190 by the trace capture process 120-2.

The adaptive timing algorithm can use, for example, the amount of trace data placed into the trace buffer as a guide for governing the frequency at which the trace data 190 should be accessed from the trace buffer 160. For example, if the difference between the previous and current trace buffer pointer variables is a large, then a large amount of trace data 190 has been added to the trace buffer 160 by the software program 153-1 operating in trace mode. Accordingly, the adaptive timing algorithm may determine that a shorter wait time period or delay should be used between successive accesses of trace data 190 in the trace buffer 160 in order to ensure that all trace data 190 is extracted and to avoid newer trace data being overwritten onto older trace data that might not yet have been accessed. Alternatively, if the difference between the previous and current trace buffer pointer variables is relatively small, this indicates that a small amount trace data 190 was placed into the trace buffer 160. Thus, the adaptive timing algorithm can increase the wait time period between successive accesses of trace data 190.

While not specifically shown, embodiments of the invention can use an adaptive timing algorithm that keeps a histogram of the relative sizes or amounts of trace data that are placed into the trace buffer 160 upon each iteration of step 403. Using such a histogram, the adaptive timing algorithm can detect patterns of increasing or decreasing amounts of trace data being placed into the trace buffer over prolonged periods of time during which the software program 153 operates and can adjust the wait time period accordingly. If an increase in an amount of trace data exceeds a predetermined amount of data over a predetermined time period, the adaptive timing algorithm can decrease the time period with which to wait in step 403 before continuing processing, whereas a decrease in the amount of trace data may cause the adaptive timing algorithm to increase the predetermined time period with which to wait in step 403 before proceeding.

Example amounts of time to wait between successive queries of the value of the current trace buffer pointer (i.e., the time period with which to wait in step 403) might be one second or more while amounts of trace data 190 being added to the trace buffer 160 are relatively small, while shorter amounts of time, such as one-quarter second or less, may be used in step 403 if trace events happen rapidly or if amounts of trace data 190 become larger. Once the time period elapses as determined by the adaptive timing algorithm, processing proceeds from step 403 to step 404.

In step 404, the trace capture process 120-2 then sets the previous trace buffer pointer equal to the current trace buffer pointer and processing returns to step 401 in order to repeat the process of querying the data storage system 150 to determine if trace data 190 has been placed in the trace buffer 160.

In this manner, the trace capture process 120-2 can perform successive iterations of steps 401 to 404 to detect advancement of the trace buffer pointer 230 within the cache 158 of the data storage system 150. Once the current trace buffer pointer value differs from a previous trace buffer pointer value (as maintained by the trace capture process 120-2), processing proceeds to steps 405 to 410 in order to have the trace capture process 120-2 access the trace data 190 that has been added to the trace buffer 160.

In particular, in step 405, the trace capture process 120-2 first performs a check to determine if the value of the current trace buffer pointer variable is less than (<) the value of the previous trace buffer pointer variable. Essentially, step 405 causes the trace capture process 120-2 to check for the special case or possibility that trace data 190 may have been written (i.e., by the software program 153-1 operating in trace mode to cause trace routines 155 to place the trace data 190 into the trace buffer 160) to the trace buffer 160 in an amount which exceeds or goes beyond the end of the trace buffer 160. For purposes of the explanation of processing up to this point, assume that the value of the current trace buffer variable is not less than the value of the previous trace buffer pointer variable. In other words, assume that at this point in processing, the current trace buffer pointer 230-C is ahead of (i.e. is greater than) the previous trace buffer pointer in the trace buffer 160. As such, trace capture process 120-2 processing proceeds to step 408.

In step 408, the trace capture process 120-2 determines an amount (e.g., a number of bytes) of trace data 190 that has been written to the trace buffer 160. In this example embodiment, a variable "SIZE_OF_TRACE_DATA" is set equal to the value of the current trace buffer pointer variable minus the value of the previous trace buffer pointer variable. The difference between these trace buffer pointer values reflects the amount of trace data 190 added to the trace buffer 160. Once this amount of trace data 190 is determined, processing proceeds to step 409.

In step 409, the trace capture process 120-2 provides a request for the trace data 190 in the trace buffer 160. This is done in this embodiment via a system call 240 to the event trace routine 300. The parameter value 241 (i.e., a trace buffer pointer value) used in the system call 240 to the event trace routine 300 in step 409 contains the value of the previous trace buffer pointer variable, while the parameter value 242 for the amount of data to read from the trace buffer 160 contains the value of the parameter SIZE_OF_TRACE_DATA, as determined in step 408 explained above. In this manner, the call 240 to the event trace routine 300 in step 409 causes the event trace routine 300 to read an amount of trace data 190 as specified by the parameter SIZE_OF_TRACE_DATA beginning in a trace buffer location 162 determined by the value of the previous trace buffer pointer variable. As will be explained shortly, the request for trace data provided to the data storage system 150 in this manner causes the event trace routine 300 to return the requested trace data 190 from the trace buffer 160 to the trace capture process 120-2 in response to the request. In step 409, once the trace data 190 is received (i.e., via response 250 in FIG. 3) by the trace capture process 120-2, processing proceeds to step 410 in FIG. 4.

In step 410, the trace capture process 120-2 stores the trace data 190 obtained in step 409 into the trace database 122. At this point, the processing of the trace capture process 120-2 proceeds back to step 403 and 404 at which point the previous trace buffer pointer variable gets set equal to the current trace buffer pointer variable.

In this manner, returning to step 404 causes the previous trace buffer pointer variable in the trace capture process 120-2 to always remain up-to-date with the most recent value of the current trace buffer pointer variable, once the trace data 190 existing in the trace buffer 160 between these pointer values has been obtained (i.e., has been read) in step 409. That is, once the trace capture process 120-2 obtains any trace data 190 that exists in the trace buffer 160 between the previous and current values of the trace buffer pointer, the previous value of the trace buffer pointer is set to the current value of the trace buffer pointer and the trace capture process 120-2 returns to the iterative processing of steps 401 through 404 in order to detect further advancement of the current trace buffer pointer.

Using these processing techniques, embodiments of the invention can periodically detect advancement of the trace buffer pointer which indicates that trace data has been added to the trace buffer 160. Upon such a detection, the trace capture process 120-2 can determine how much trace data 190 has been added based on its knowledge of the previous value of the trace buffer pointer in comparison to the current value of the trace buffer pointer. The trace capture process 120-2 can then use the event trace routine 300 via a system call 240 which indicates to the event trace routine 300 exactly how much trace data 190 is to be read from the trace buffer 160, beginning at the location corresponding to the previous trace buffer pointer (and extending in length up to the current trace buffer pointer). Once the trace data 190 has been obtained via this technique, the trace capture process 120-2 can update the previous trace buffer pointer value to be equal to the current trace buffer pointer value and can then proceed to detect another advancement of the trace buffer pointer. This processing repeats itself such that trace data 190 is continually extracted from the trace buffer 160 in an automated manner.

The frequency at which this processing occurs can be controlled, as explained above, by an adaptive timing algorithm which waits a time period between accesses to trace data 190 to allow for extraction of the trace data 190 from the trace buffer 160 in substantially a real-time manner. That is, the faster that the software program 153-1 performs and/or encounters trace events which cause the creation of trace data 190 in the trace buffer, the faster the trace capture process 120-2 performs iterations of the processing shown in FIG. 4.

Returning attention now briefly back to the example configuration illustrated in FIG. 3, the general operation of the processing shown in FIG. 4 will be explained in relation to the example occurrences of events as illustrated by trace buffer pointer positions 230.

Upon the start of the processing in FIG. 4, the trace buffer pointer 230 begins at location 230-1 and the trace buffer 160 is empty. As the software program 153-1 operates in trace mode and begins to place portions of trace data 190 into the trace buffer 160, the processing steps 401 through 404 detect the first addition of trace data 190 into the trace buffer 160 by advancement of the trace buffer pointer from position 230-1 (value saved as the previous trace buffer pointer) to position 230-2 (value of a current trace buffer pointer at this point in processing). The repetitive system calls 240-0 illustrated in FIG. 3 show how the event trace routine 300 can be used in this manner to detect advancement of the trace buffer pointer. After each advancement of the trace buffer pointer from 230-1 to 230-2, then from 230-2 to 230-3, and then from 230-3 to 230-4, step 401 detects the change of the current trace buffer pointer value from the previous trace buffer pointer value and processing proceeds from step 402, through step 405, to step 408 which computes the size, or amount, of trace data 190 added to the trace buffer 160. Step 409 then requests and receives (i.e., accesses or reads) the relevant portions of trace data 190 and also obtains the most recent value for the current trace buffer pointer 230. Once the trace data is stored, step 403 resets the previous trace buffer pointer value and the process repeats to detect the next advancement of the trace buffer pointer.

Returning attention now to processing step 405, eventually, as more and more trace data 190 is added to the trace buffer 160 during trace mode operation of the software program 153-1, the portions of trace data 190 will reach the end of the trace buffer 160 (i.e., will be written to the trace buffer location 162-N and then back to location 162-1). When this happens, the trace routines 155 (FIG. 3) begin writing new trace data 190 over older portions of trace data (e.g., trace data portions 190-1, 190-2, and so forth) at the start of the trace buffer 160.

Figure 6:
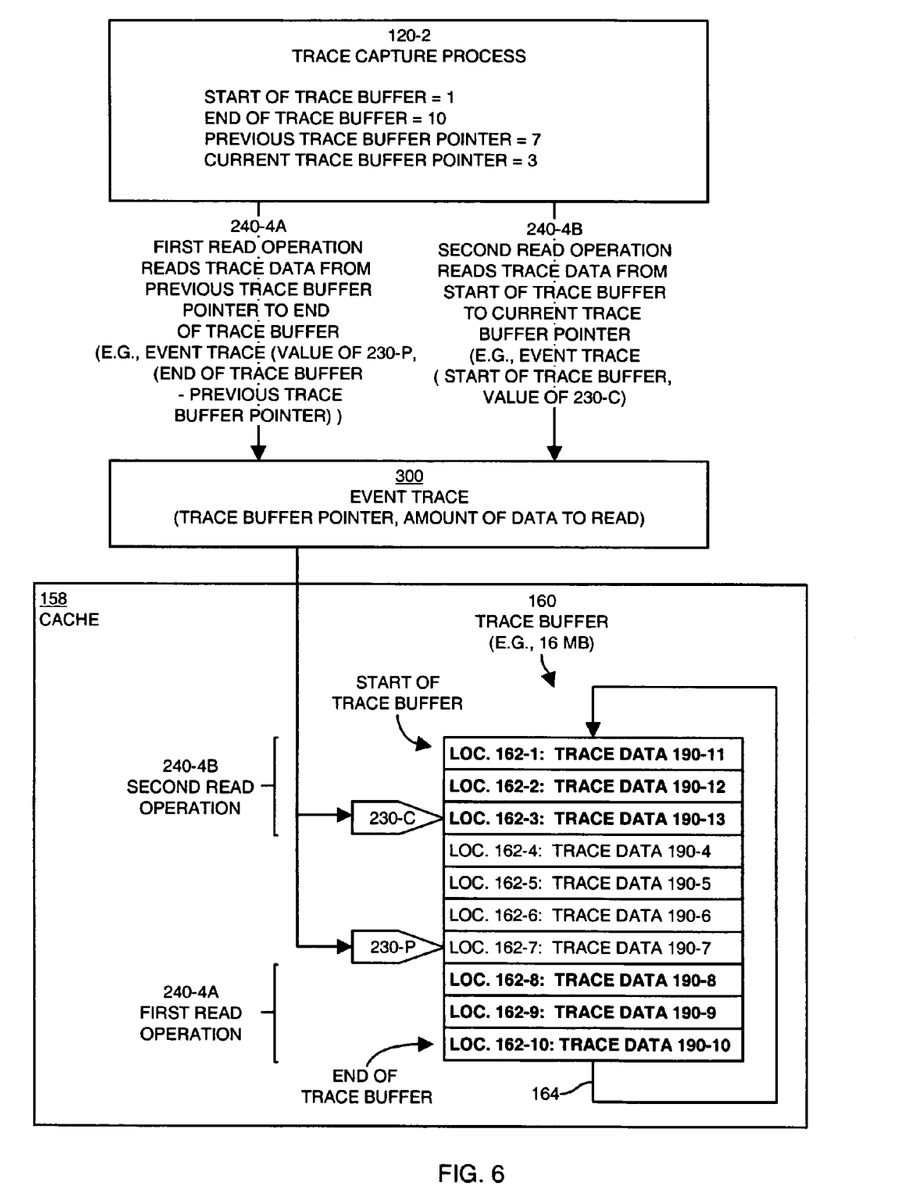
FIG. 6 illustrates an example interaction between a trace capture process, an event trace routine, and a trace buffer in which newer trace data has overwritten older trace data in the trace buffer.

FIG. 6 illustrates an example of this scenario in which the trace buffer 160, as it existed in FIG. 3, subsequently receives, via an occurrence of a trace event during trace mode operation of the software program 153-1, portions of trace data 190-8 through 190-13. Recall that the trace buffer 160 is a circular trace buffer. As such, since that are six portions of trace data 190-8 through 190-13, the trace routines 155 that generate the portions trace data 190-8 through 190-13 write the first three portions of trace data 190-8 through 190-10 into the trace buffer locations 162-8 through 162-10, while the remaining three portions of trace data 190-11 to 190-13 are written into the trace buffer 160 beginning at the start of the trace buffer 160 (i.e., into trace buffer locations 162-1 through 162-3).

Figure 5:
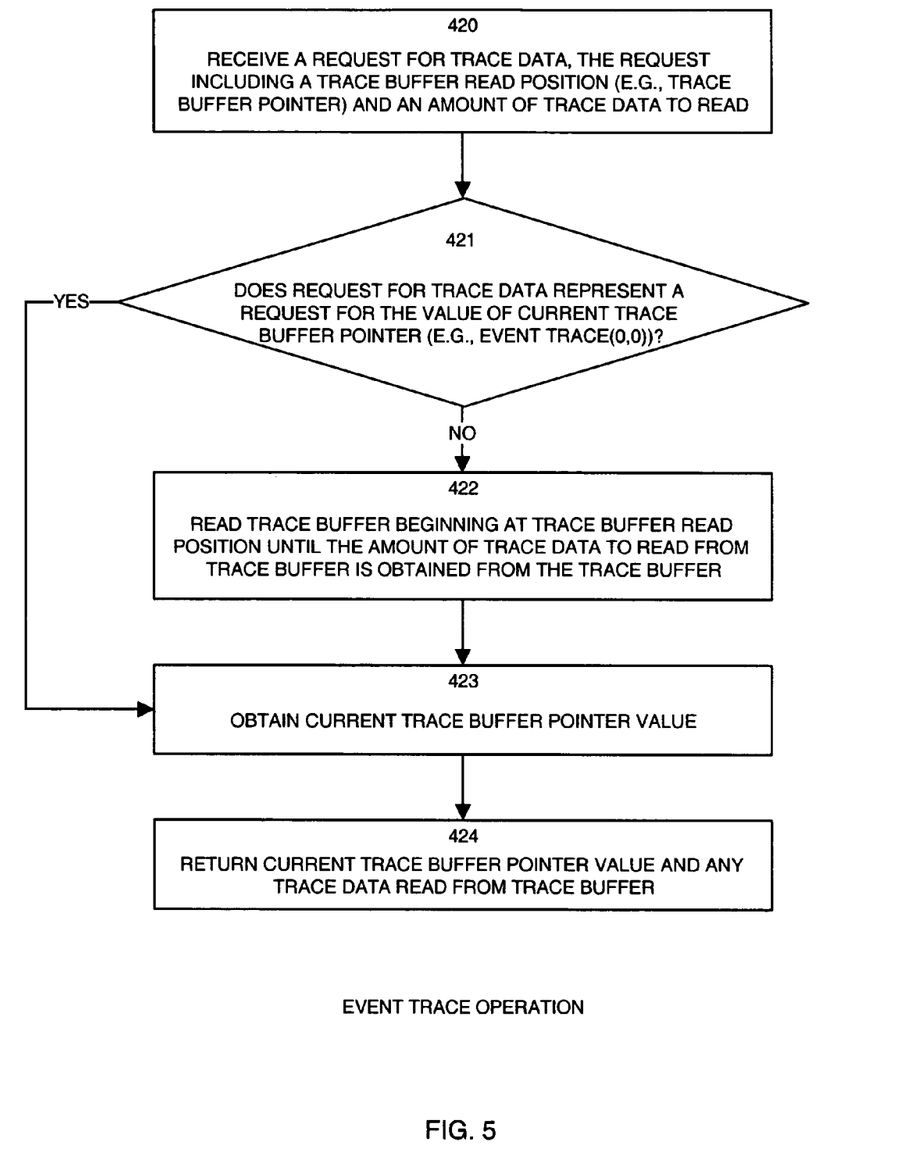
FIG. 5 is a flow chart of processing steps that show the operation of an event trace routine in a data storage system configured according to embodiments of the invention to access trace buffer pointer information and trace data in a trace buffer.

FIG. 6 also illustrates the values of both the current trace buffer pointer 230-C as well as the previous trace buffer pointer 230-P after the trace routines 155, under control of the software program 153-1, write the trace data portions 190-8 through 190-13 into the trace buffer 160. Example numerical values of these variables (corresponding to trace buffer location positions) are illustrated at the top of FIG. 5 within the trace capture process 120-2. Specifically, the start of the trace buffer is 1, the end of the trace buffer is 10, and the value of the current trace buffer pointer 230-C is equal to the trace buffer location 162-3 or "3", while the value of the previous trace buffer pointer 230-P is equal to the trace buffer locations 162-7 or "7".

Returning now to the discussion of the processing in step 405 in FIG. 4 (and referring to FIG. 6), under the aforementioned circumstances, the value of the current trace buffer pointer variable 230-C (at trace buffer location 162-3) is less than the value of the previous trace buffer pointer variable 230-P (at trace buffer location 162-7). This indicates that trace data 190 has been written beyond the end of the trace buffer 160 and has thus overwritten portions of trace data 190 beginning at the start of the trace buffer (trace buffer location 162-1). In this instance, the processing of the trace capture process 120-2 in step 405 detects this situation and proceeds to step 406.

In step 406, the trace capture process 120-2 first reads an amount of trace data starting from the location of the previous trace buffer pointer 230-P and extending to the end of the trace buffer (trace buffer location 162-10). As shown in FIG. 4, the exact amount of trace data 190 which the trace capture process 120-2 accesses in this manner (i.e., the amount of data to read parameter 242) can be computed by subtracting the value of the previous trace buffer pointer variable (e.g., corresponding to trace buffer location 162-7 or just "7" in this example) from the value equal to the end of the trace buffer (e.g., "10" in this example). The result reflects the amount of trace data to be read from the position of the previous trace buffer pointer 230-P to the end of the trace buffer (i.e. up to and including the portion of trace data 190-10 stored in trace buffer location 162-10). As will be explained shortly, the call to the event trace routines 300 as illustrated in step 406 also causes the event trace routines to return the value of the current trace buffer pointer which corresponds to location 230-C in FIG. 6. Next, processing proceeds from step 406 to 407.

In step 407, the trace capture process 120-2 sets the value of the previous trace buffer pointer variable to be zero ("0"). Processing then proceeds to steps 408 through 410 which operate as explained above according to the current values of the previous and current trace buffer pointer variables. In other words, if the trace capture process 120-2 performs steps 408 to 410 after processing steps 406 and 407 as explained above, the value of the previous trace buffer pointer variable is zero and thus the trace data 190 obtained in response to the second system call to the event trace routines 300 in step 409 causes the event trace routines 300 to access the remaining portions of trace data 190-11 to 190-13 beginning at the start of the trace buffer and extending into the trace buffer 160 up to including the trace buffer location 162-3 of the current trace buffer pointer 230-C.

Accordingly, in situations where the trace data 190 is written to the trace buffer 160 beyond the end of the trace buffer, the trace capture process 120-2 of this embodiment of the invention accesses the trace data 190 using two separate system calls, as illustrated in FIG. 6 is system calls 240-4A and 240-4B. The system call 240-4A performs a first read operation to read trace data 190 from the previous trace buffer pointer location 230-P to the end of the trace buffer 160, while the second system call 240-4B performs a second read operation to read any remaining portions of trace data 190 (i.e., portions which overwrite older trace data) from the start of the trace buffer to the current trace buffer pointer location 230-C. In this manner, the trace capture process 120-2 of the invention is able to retrieve all trace data 190 from the trace buffer 160, even in situations where the trace data 190 is so voluminous so as to extend from the end of the trace buffer back to the beginning of the trace buffer.

FIG. 5 illustrates a flow chart of the processing operations performed by an event trace routine 300 configured according to one embodiment of the invention. As explained above, the event trace routine 300 resides as an operable entity (e.g., a system call, library routine, subroutine or other accessible logic entity) within the data storage system 150 and is remotely operable (i.e., callable) by the trace capture process 120-2. Generally, the event trace routine 300 operates as explained above to return a trace buffer pointer value 230 and also, in some instances, portion(s) of trace data 190, depending upon the values of the parameters 241, 242 passed via the systems calls 240 to the event trace routine 300.

Specifically, in step 420, the event trace routine 300 receives a request for trace data (e.g., receives a system call 240). The request 240 includes a value (i.e., a parameter setting) for a trace buffer read position 241 (FIG. 3) as well as an amount of trace data to read 242 (FIG. 3). Such parameter values may be zero or non-zero values, which effects how the event trace routine 300 operates.

In step 421, the event trace routine 300 determines if the request for trace data (e.g., the system call 240) represents a request for the value of the current trace buffer pointer, or whether the request 240 also represents a request for trace data. Such a determination may be made by examining one or more of the values of the trace buffer pointer parameter 241 and/or the amount of trace data to read parameter 242 to determine if such values are zero. In a preferred embodiment of the invention, if the trace capture process 120-2 provides a system call 240 to the event trace routine 300 which contains zero values for both parameters 241 and 242, then the event trace routine 300 in step 421 determines that the request for trace data (i.e., the system call containing the zero value parameters) is only a request for the current value of the trace buffer pointer 230.

If this is the case (i.e., if the system call 240 contains a call to the event trace routine containing parameters having a value of 0), then processing proceeds to step 423 at which point the event trace routine 300 obtains the current trace buffer pointer value 230 from the trace buffer 160.

Next, in step 424, the event trace routine 300 returns the current trace buffer pointer value 230 and any portions of trace data 190 that were read from the trace buffer 160. Such portions of trace data 190 may be read from the trace buffer 160, if, in step 421, the event trace routine 300 determines that the request for trace data 190 (e.g., system call 240) represents a request for trace data 190, in addition to a request for the value of the current trace buffer pointer 230.

That is, returning to step 421, if the request for trace data 240 contains non-zero parameter values 241 and 242, then processing proceeds to step 422 at which point the event trace routine 300 reads portions of trace data 190 from the trace buffer 160 beginning at the trace buffer read position parameter 241 and continuing until the amount of trace data to be read (i.e., as represented by parameter 242) is obtained (i.e. is read) from the trace buffer 160. This trace data is then returned to the calling entity, which in these examples is the trace capture process 120-2.

Using such techniques, an event trace routine 300 configured according to embodiments of the invention is able to accept requests for either the value of the current trace buffer pointer 230, or the value of the current trace buffer pointer 230 in addition to one or more portions of trace data 190 which are to be obtained from the trace buffer 160. In response to such a request, the event trace routine 300 can access the request information and can return such information to the calling trace capture process 120-2 for use as explained above to extract trace data 190 from the trace buffer 160 within the data storage system 150.

While the example explanations of preferred embodiments presented herein explain certain techniques for accessing trace data within the data storage system 150, it is to be understood by those skilled in the art that variations on these mechanisms and techniques are possible and are intended to be within the scope of embodiments of the invention. For example, the host computer system 110 may be any type of general purpose or dedicated (e.g., specific purpose) computer system and it is to be understood that the host computer system 110 shown in the figures is shown by way of example only and there may be multiple host computer system 110 that each perform a trace capture process 120-2 to capture trace data 190. In such a configuration (i.e., multiple trace capture processes), each trace capture process can capture trace data from the same data storage system 150, or each trace capture process might be responsible for capturing different portions of trace data 190 from different data storage systems that operate, for example, in a storage area network (SAN) environment.

In another alternative configuration, different trace capture processes 120-2 (operating on the same or on different host computer system 110) might be responsible for capturing trace data 190 for different types of trace events. Thus, one configuration can provide, for example, a trace capture process 120-2 for capturing trace data related to certain I/O requests that take place over the data interface 130 between a host and the data storage system 150, while another trace capture process 120-2 can be responsible for capturing other trace data 190 related to fault events within the software application 153-1. In another alternative configuration, a single trace capture process 120-2 can operate to capture trace data from multiple data storage systems 150. Such a single or central trace capture process can operate on a host computer system 110 that serves as a SAN diagnostic system which is responsible for gathering trace data 190 from many data storage systems 150 within the storage area network.

In yet another alternative, the trace capture process 120-2 itself can be distributed such that host computer systems 110 that operate as servers for the individual data storage systems 150 (e.g., where each data storage system 150 has a server host 110 in a SAN environment) operate according to embodiments of the invention to capture trace data from their respective data storage systems 150 and then forward, replay or otherwise transfer the trace data 190 (once capture within the hosts 110) to a central host computer system 110 for further analysis.

Likewise, the data storage system 150 can be any type of data storage system, large or small, and may contain any number of processors that operate one or more software programs 153 that produce trace data 190 in a manner such as that explained above. According to such an alternative configuration, there can be multiple instances of different event trace routines 300 (e.g., one or more within each software program 153) which can be selectively operated or activated by one or more remotely executing trace capture processes 120-2 to gather select portions of trace data 190 produced by events that take place during trace mode operation of such software programs 153-1, 153-2, and so forth. Such a configuration is useful, for example, where there are multiple software programs 153-1, 153-2, that operate independently of each other within a data storage system 150. In such cases, each software program 153 can include one or more respective event trace routines 300 which, when called upon by one or more remotely operating trace capture processes 120-2, perform according to the embodiments discussed above to return trace buffer pointer and trace data information.

Those skilled in the art will understand that there can be many other variations made to the operations of the embodiments explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
    while a trace function actively produces trace data for temporary storage in a respective buffer associated with a data storage system:
        i) monitoring an availability of trace data stored in the respective buffer; and
        ii) initiating retrieval of the trace data in the respective buffer based on the availability.

2. A method as in claim 1, wherein steps of i) monitoring an availability of trace data stored in the respective buffer; and ii) initiating retrieval of the trace data in the respective buffer based on the availability includes:
    monitoring the availability of trace data temporarily stored in the respective buffer over at least two different monitor cycles; and
    adaptively changing a rate of initiating retrieval of the trace data from the respective buffer based on the availability of trace data over the at least two different monitor cycles.

3. A method as in claim 2, wherein adaptively changing the rate of initiating retrieval of the trace data from the respective buffer includes:
    when detecting an increase in an amount of newly added trace data above a predetermined threshold as measured from a first monitor cycle to a second monitor cycle, initiating a more frequent retrieval of trace data from the respective buffer; and
    when detecting a decrease in an amount of newly added trace data below a predetermined threshold as measured from a first monitor cycle to a second monitor cycle, initiating a less frequent retrieval of trace data from the respective buffer.

4. A method as in claim 1, wherein monitoring the availability of trace data stored in the respective buffer includes:
    maintaining a first data value representing a first location in the respective buffer up to which the trace data was retrieved in a previous trace data retrieval cycle;
    in a subsequent trace data retrieval cycle occurring after the previous trace data retrieval cycle, identifying a second data value representing a second location in the respective buffer up to which new trace data is stored in the respective buffer since the previous trace data retrieval cycle; and
    using the first data value and the second data value to calculate an amount of new trace data stored in the respective buffer during a time between the previous trace data retrieval cycle and the subsequent trace data retrieval cycle.

5. A method as in claim 1, wherein monitoring the availability of trace data stored in the respective buffer includes:
    initiating queries over successive monitoring cycles to identify a change in an amount of trace data stored in the respective buffer.

6. A method comprising:
    monitoring an availability of trace data temporarily stored in a respective buffer over at least two monitor cycles; and
    adaptively changing a rate of initiating retrieval of the trace data from the respective buffer based on the availability of the trace data in the respective buffer over the at least two monitor cycles.

7. A method as in claim 6, wherein monitoring the availability includes identifying an amount of newly added trace data added to the respective buffer; and
    wherein adaptively changing the rate of initiating retrieval of the trace data from the respective buffer prevents the respective buffer from overflowing with trace data.

8. A method as in claim 6, wherein monitoring the availability of trace data includes:
    maintaining a first data value representing a first location in the respective buffer indicating a first endpoint associated with trace data stored in the respective buffer for a previous trace data retrieval cycle;

in a subsequent trace data retrieval cycle occurring after the previous trace data retrieval cycle, identifying a second data value representing a second location in the respective buffer indicating a new endpoint associated with respective newly stored trace data in the respective buffer; and using the first data value and the second data value to calculate an amount of new trace data stored in the respective buffer during a time between the previous trace data retrieval cycle and the subsequent trace data retrieval cycle data.

9. A method as in claim 8, wherein adaptively changing the rate of initiating retrieval of the trace data from the respective buffer includes speeding up the rate of initiating retrieval of the trace data from the respective buffer to keep up with an increased pace of the respective buffer being filled with the trace data.

10. A method as in claim 6, wherein monitoring the availability of trace data temporarily stored in the respective buffer over at least two monitor cycles includes detecting an increased rate of a corresponding trace function filling the respective buffer with the trace data; and wherein adaptively changing the rate of initiating retrieval of the trace data from the respective buffer includes speeding up the rate of initiating retrieval of the trace data from the respective buffer for future cycles to keep up with the increased rate of the corresponding trace function filling the respective buffer with the trace data.

11. A method as in claim 6, wherein monitoring the availability of trace data temporarily stored in the respective buffer includes detecting advancement of a location pointer associated with the respective buffer.

12. A method as in claim 6, wherein monitoring an availability of trace data temporarily stored in the respective buffer over at least two monitor cycles includes initiating, from a remote location over a respective network, execution of an application that communicates with a data storage system executing a trace diagnostic that initiates storage of the trace data in the respective buffer.

13. A computer program product encoded with executable instructions stored on a computer readable medium, the computer program product including:

instructions enabling a computer to monitor an availability of trace data temporarily stored in a respective buffer over at least two monitor cycles; and instructions enabling the computer to adaptively change a rate of initiating retrieval of the trace data from the respective buffer based on the availability of the trace data in the respective buffer over the at least two monitor cycles.

14. A computer program product as in claim 13, wherein the instructions enabling the computer to adaptively change the rate of initiating retrieval of the trace data from the respective buffer includes instructions enabling the computer to prevent the respective buffer from overflowing with trace data.

15. A computer program product as in claim 13, wherein the instructions enabling the computer to monitor the availability of the trace data includes:

instructions enabling the computer to maintain a first data value representing a first location in the respective buffer indicating a first endpoint associated with trace data stored in the respective buffer for a previous trace data retrieval cycle;

instructions enabling the computer to identify, in a subsequent trace data retrieval cycle occurring after the previous trace data retrieval cycle, a second data value representing a second location in the respective buffer indicating a new endpoint associated with respective newly stored trace data in the respective buffer; and instructions enabling the computer to calculate an amount of new trace data stored in the respective buffer during a time between the previous trace data retrieval cycle and the subsequent trace data retrieval cycle data.

16. A computer program product as in claim 15, wherein the instructions enabling the computer to adaptively change the rate of initiating retrieval of the trace data from the respective buffer includes instructions enabling the computer to reduce the rate of initiating retrieval of the trace data from the respective buffer in accordance with a decreased pace of the respective buffer being filled with new trace data.

17. A computer program product as in claim 13, wherein the instructions enabling the computer to monitor the availability of trace data temporarily stored in the respective buffer includes instructions enabling the computer to detect advancement of a location pointer representing a corresponding location with respect to most recently data stored trace data in the respective buffer.

18. A computer program product as in claim 13, wherein the instructions enabling the computer to monitor the availability of trace data temporarily stored in the respective buffer over at least two monitor cycles includes instructions enabling the computer to initiate, from a remote location over a respective network, a trace capture application that communicates with a data storage system executing a trace diagnostic that initiates storage of the trace data in the respective buffer.

19. A computer program product encoded with executable instructions stored on a respective computer readable medium, the computer program product including:

a set of instructions enabling a computer, while a corresponding trace function produces trace data for temporary storage in a respective buffer, to i) concurrently monitor an availability of trace data stored in the respective buffer, and ii) asynchronously initiate retrieval of trace data from the respective buffer depending on the availability.

20. A computer program product as in claim 19 further comprising:

instructions enabling the computer to adaptively change a rate associated with retrieval of the trace data from the respective buffer based on an accumulated amount of the trace data in the respective buffer over a duration of time.

* * * * *